United States Patent [19]

Wehner et al.

[11] Patent Number: 4,869,071
[45] Date of Patent: Sep. 26, 1989

[54] COOLING SYSTEM FOR AN AIRCRAFT POD

[75] Inventors: Jeffrey M. Wehner; James L. Bettenga, both of San Diego; Guido Biagini, Poway; William J. Godecker; David B. Wigmore, both of San Diego, all of Calif.

[73] Assignee: Sundstrand Corporation, Rockford, Ill.

[21] Appl. No.: 172,420

[22] Filed: Mar. 24, 1988

[51] Int. Cl.⁴ .............................................. B60H 1/32
[52] U.S. Cl. ......................................... 62/133; 62/61; 62/175; 62/332
[58] Field of Search ................. 62/133, 172, 175, 332, 62/61

[56] References Cited

U.S. PATENT DOCUMENTS

| | | | |
|---|---|---|---|
| 3,177,676 | 4/1965 | Abrahams | 62/172 |
| 3,208,234 | 9/1965 | Messinger | 62/172 |
| 4,209,993 | 7/1980 | Rannenberg | 62/80 |
| 4,313,310 | 2/1982 | Kobayashi et al. | 62/332 X |
| 4,462,561 | 7/1984 | Cronin | 244/118.5 |
| 4,550,573 | 11/1985 | Rannenberg | 62/172 |
| 4,674,704 | 6/1987 | Altoz et al. | 244/1 R |

FOREIGN PATENT DOCUMENTS 2027874 2/1980 United Kingdom .
2076897 12/1981 United Kingdom .

Primary Examiner—William E. Wayner
Attorney, Agent, or Firm—Antonelli, Terry & Wands

[57] ABSTRACT

A cooling system is disclosed for a pod (20) of an aircraft. The cooling system includes an air circulation loop (28) for supplying cooled air to an air input (32) of the pod to cool a load disposed in the pod and for receiving air discharged from an air discharge (34, 35) to the pod which has absorbed heat from the pod. A cooling apparatus (30) is disposed in the loop which is activated to cool air flowing in the loop prior to application to the pod. A fan (48) is located in the air circulation loop between the cooling apparatus and the air discharge (35) which is activated to blow discharged air toward the cooling apparatus when the aircraft is operated in a first portion of the flight envelope. A ram air supply (44) supplies ram air in response to flight of the aircraft. A valve (46), which is coupled to the ram air supply and to the loop blocks the supply of ram air to the loop in response to the aircraft being in the first portion of the flight envelope and supplies ram air to the loop when the aircraft is outside the first portion of the flight envelope. A controller (38), responsive to a temperature sensor (52) sensing air temperature of air supplied to the pod controls the activation of the cooling apparatus in response to the sensing of a temperature above a predetermined temperature when the aircraft is operating in the first portion of the flight envelope.

11 Claims, 3 Drawing Sheets

COOLING SYSTEM FOR AN AIRCRAFT POD

TECHNICAL FIELD

The present invention relates to cooling systems for pods attached to aircraft.

BACKGROUND ART

A pod is an external structure attached to the underside of an aircraft which contains navigation, targeting or other equipment. Because of power dissipated by electronic equipment contained in a pod, it has been necessary to cool the pod to maintain proper operation of electronics contained therein.

FIG. 1 illustrates a prior art liquid pod cooling system. Parts of the cooling system have been functionally labeled. In practice, these systems have proved satisfactory to maintain proper temperatures of electronics contained within the pod. However, a number of problems exist with the liquid pod cooling systems. In the first place, coolant liquids, such as Coolanal ® which are placed in contact with electronics in the pod to provide cooling may, if contaminated, become flammable. The possible flammability of cooling liquids is an area of concern in fighter aircraft. Furthermore, it may not be desirable to utilize cooling liquids for certain types of electronics. Finally, liquid cooling systems for pod electronics are rendered inoperative by fluid leaks in the liquid cooling system. As illustrated in FIG. 1, the liquid cooling system 10 for a pod electronics load 12 consists of a first liquid loop 14 and a second liquid loop 16. The first loop 14 has a liquid, such as Coolanal ® 25, flowing through the pod electronics load 12 which is cooled by ram air as indicated in the top of FIG. 1. This loop is utilized without operation of the compressor when the temperature of the ram air is sufficiently low to provide the necessary degree of cooling to the pod electronics load 12. Furthermore, a conventional vapor cooling system is provided which circulates cooled liquid in the second loop 16 when the air temperature of the ram air is insufficient to cool the liquid to a degree to provide necessary cooling for the pod electronics load 12. The operation of the vapor cooling cycle is conventional and is not herein further described.

DISCLOSURE OF THE INVENTION

The present invention provides an air cooling system for a pod attached to an aircraft. The air cooling system avoids the aforementioned problems of the prior art pertaining to flammability, sensitivity of electronics to liquid coolants and potential loss of cooling capacity as a consequence of liquid leakage. The present invention provides a forced air pod cooling system which cools the pod with air which has been conditioned in accordance with the portion of a flight envelope in which the aircraft carrying the pod is operating. The invention utilizes a combination of ram air cooling and a conventional vapor cooling cycle to cool air flowing in a loop communicating with the pod. The vapor cooling cycle is used when the cooling capacity of ram air ducted into the loop or the temperature of air in the closed loop is insufficient to cool the pod. The invention may also be utilized to cool any nonpressurized volume within an aircraft.

A cooling system for a pod attached to an aircraft in accordance with the present invention includes an air circulation loop for supplying cool air to an air input of the pod to cool a load disposed within the pod and for receiving air discharged from an air discharge of the pod which has absorbed heat from the load in the pod; a cooling apparatus disposed in the loop which is activated to cool air flowing in the loop prior to application to the pod; a fan disposed in the air circulation loop between the cooling apparatus and the air discharge which is activated to blow discharged air toward the cooling apparatus when the aircraft is operated in a first portion of the flight envelope of the aircraft; a ram air supply for providing ram air in response to the flight of the aircraft; a valve, coupled to the ram air supply and to the loop, for blocking the supply of ram air to the loop in response to the aircraft being in the first portion of the flight envelope and for supplying ram air to the loop when the aircraft is outside the first portion of the flight envelope; and a controller, responsive to a temperature sensor sensing air temperature of air supplied to the input of the pod, for activating the cooling apparatus in response to the sensing of a temperature above a predetermined temperature when the aircraft is operating in the first portion of the flight envelope. Furthermore, an altitude sensor measures the aircraft altitude and the controller determines in which portion of the flight envelope the aircraft is operating by monitoring the altitude of the aircraft as determined by the sensor. The aircraft has second and third portions of the flight envelope with each of the second and third portions of the flight envelope being determined by the controller as a function of aircraft velocity and altitude as determined by the altitude sensor. The valve is caused by the controller to supply ram air to the loop in response to the controller determining that the aircraft is in the second and third portions of the flight envelope; and the fan is caused to be deactivated by the controller in response to the controller determining that the aircraft is operating in the second and third portions of the flight envelope; and the cooling apparatus is caused to be activated in response to the controller determining that the aircraft is operating in a third portion of the flight envelope and deactivated in response to the controller determining that the aircraft is operating in the second portion of the flight envelope. Furthermore, an overboard valve is coupled to the loop for venting air from the loop directly overboard in response to the controller determining that the aircraft is operating in the second portion of the flight envelope. A regenerative heat exchanger precools ram air from the ram air supply which is applied to the cooling apparatus with air discharged from the pod when the aircraft is determined to be operating in the third portion of the flight envelope with the overboard valve venting air overboard after application to the heat exchanger. A relief valve is coupled to the loop for venting air from the loop when the air pressure in the loop exceeds a predetermined pressure to which the pod should not be subjected. The cooling apparatus may also be activated in response to the temperature sensor sensing a temperature above a predetermined temperature when the aircraft is determined to be operating by the controller in the second and third portions of the flight envelope. The controller may be set up to activate the cooling apparatus in response to the same temperature being sensed in the first, second and third portions of the flight envelope; may be set up to activate the cooling apparatus in response to a first predetermined temperature being sensed in the first portion of the flight envelope; may be set up to activate the cooling apparatus in response to a second different predetermined temperature being sensed in the second and third portions of the flight envelope; and finally may be set up to activate the cooling apparatus in response to different predetermined temperatures being sensed in each of the first, second and third portions of the flight envelope.

BEST MODE FOR CARRYING OUT THE INVENTION

Figure 1:
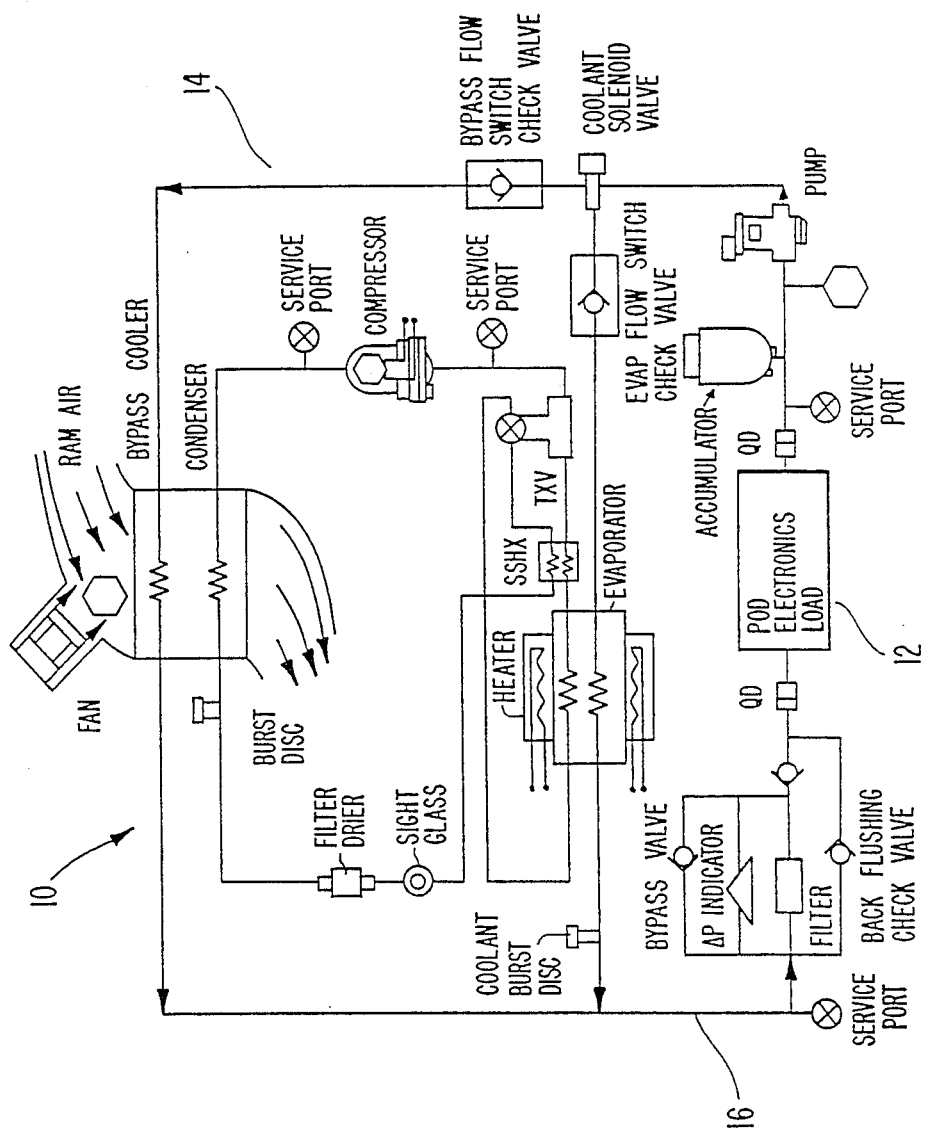
FIG. 1 is a diagram of a prior art liquid pod cooling system.
Figure 2:
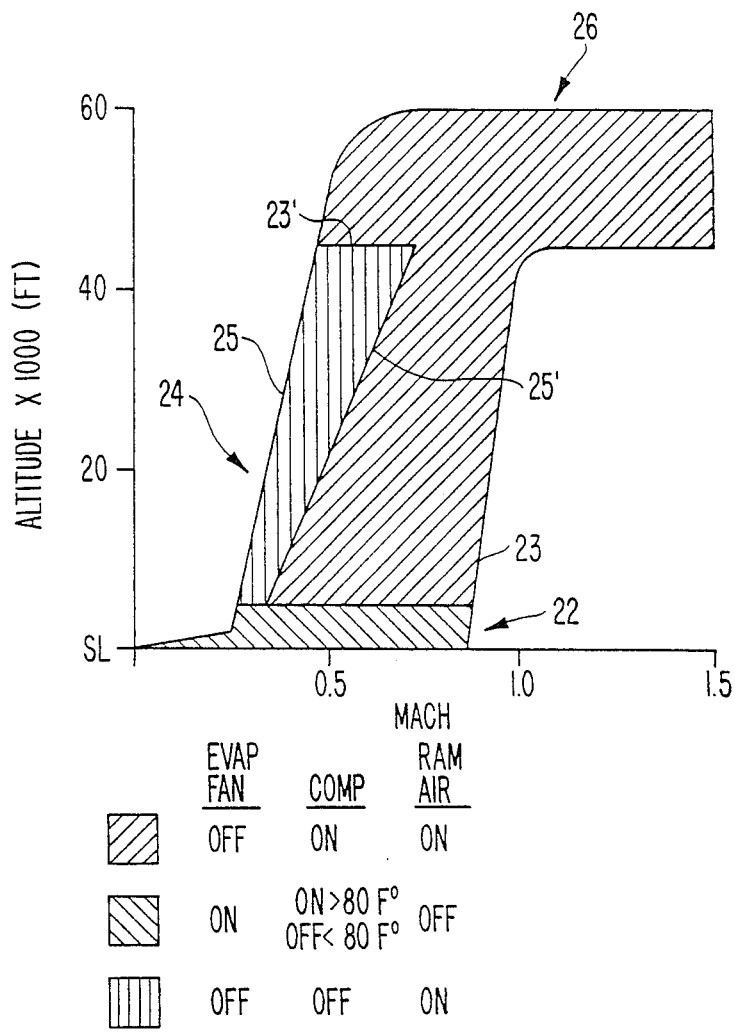
FIG. 2 is a diagram of the operation of the cooling system of the present invention as a function of the flight envelope of an aircraft
Figure 3:
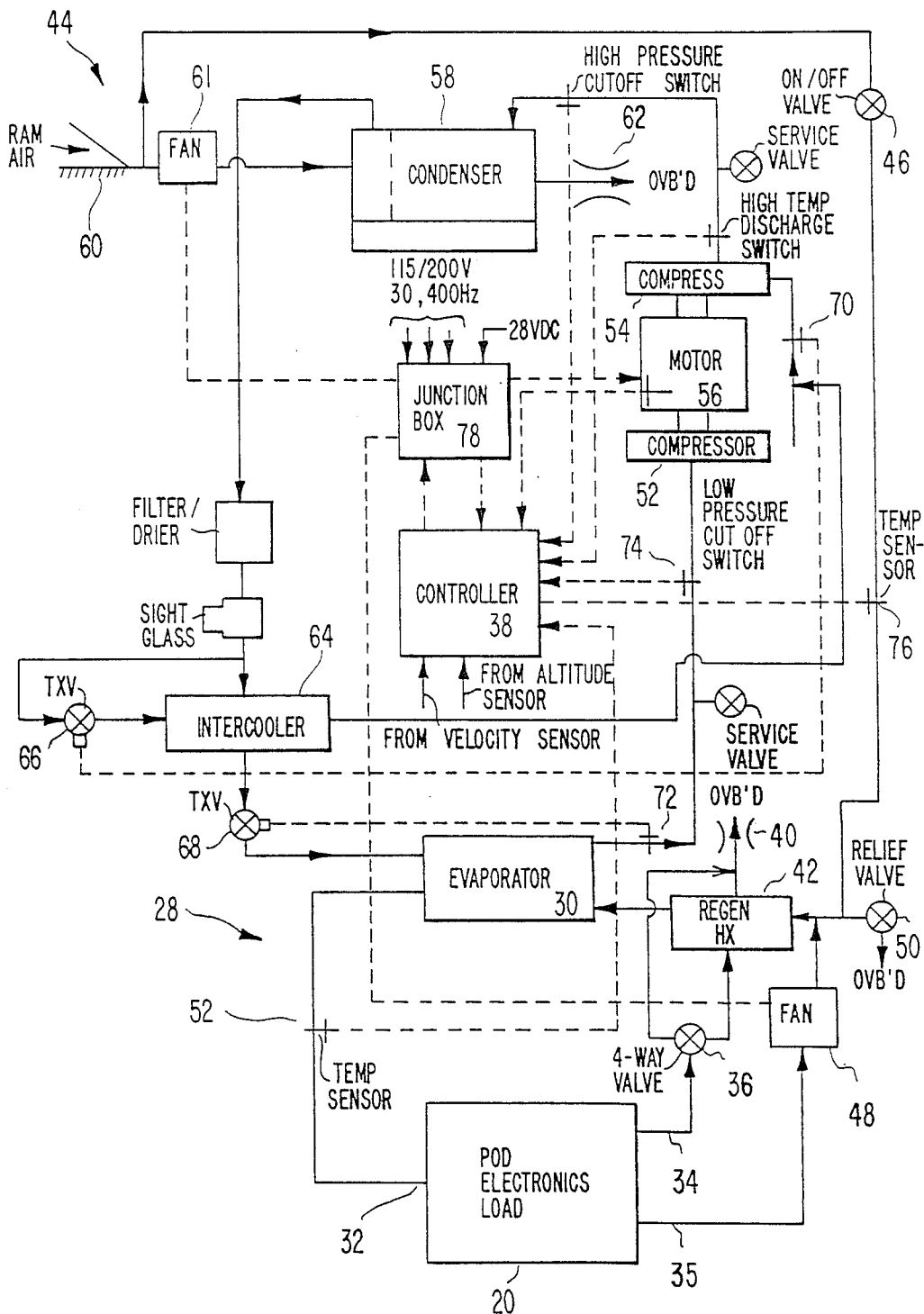
FIG. 3 illustrates a block diagram of an embodiment of the present invention.

FIG. 2 illustrates a diagram of the operation of an embodiment of the present invention with respect to the flight envelope of an aircraft. It should be understood that the present invention is not limited to the flight envelope of FIG. 2 or to a cooling system having an operation corresponding to the three distinct portions of a flight envelope as illustrated. The embodiment of the present invention discussed below with reference to FIG. 3 provides air cooling for a pod having three distinct modes of operation which correspond to three portions of the flight envelope of the aircraft as illustrated. With reference to FIG. 2, the first portion of the flight envelope 22 corresponds to altitudes between ground and an altitude 23 such as 5,000 feet which includes all velocities of the aircraft in which the pod is operational for its intended purpose from 0 up to those approaching Mach 1. The second portion of the flight envelope 24 corresponds to altitudes between the altitude 23 and altitude 23' within a range of aircraft velocities from a minimum velocity line 25 to a second higher velocity line 25'. The third portion 26 of the flight envelope corresponds to altitudes above the first altitude 23 and at a higher velocity than the velocity line 25' and at altitudes above the velocity line 23'. As will be described below with reference to FIG. 3, these three portions 22, 24 and 26 of the flight envelope require different cooling capacities to maintain the temperature of the pod within a desired operating temperature. Determination of which portion of the flight envelope the aircraft is operating in is determinable by altitude and velocity measurements which are obtainable from conventional instrumentation on a jet aircraft.

With reference to FIG. 3, an air circulation loop 28 provides cooled air from an evaporator 30, which is part of a conventional refrigeration system that is described below, to pod 20. Cooled air enters the pod 20 from air input port 32 and is discharged from the pod by air discharge ports 34 and 35. The port 34 is coupled to a conventional four-way valve 36 which is controlled by controller 38. It should be understood that control lines from the controller 38 to various valves discussed below have been omitted for purposes of simplifying the drawings. In one position, the four-way valve 36 dumps air directly overboard via discharge port 40 when the cooling system is operating in the second mode as discussed below. In the second position, the four-way valve 36 applies air from the discharge 34 to a regenerative heat exchanger 42 which functions to precool air being input from ram air supply 44 when the cooling system is operating in the third mode as described below. The ram air supply 44 is selectively coupled to the loop 28 by means of valve 46 which is controlled by the controller 38. Fan 48 provides air pressure for circulating air within the loop 28 which is closed to ram air during the first mode of operation as described below. In the first mode of operation within the first portion 22 of the flight envelope, the cooling capacity of the evaporator 30 is sufficient to cool the pod load with the air flow provided by the fan 48. A relief valve 50 opens to dump air from the loop 28 overboard when the pressure in the loop reaches a predetermined limit which should not be exceeded in the pod 20. Temperature sensor 52 is provided in the portion of the loop between the evaporator 30 and the air input 32 to sense the temperature of the air flowing into the pod 20. The temperature sensor 52 is monitored by the controller 38 to control the thermostatic activation of the cooling system.

The cooling system is a conventional vapor cooling system having a first stage compressor 52 and a second stage compressor 54 which is driven by motor 56 under the control of the controller 38. The temperature sensed by temperature sensor 52 may be used to control the cycling of the motor 56 to maintain a constant input temperature to the pod for each of the three distinct operation cycles or alternatively to provide a different input temperature for each of the three distinct operation cycles and may be a function of aircraft altitude and/or velocity. The operational mode of the cooling system may be as illustrated in FIG. 2 in which the cooling system is continually on for the third portion 26 of the flight envelope, is thermostatically cycled on and off for the first portion 22 of the flight envelope and shut off for the second portion 24. Another alternative is that the input temperature may be maintained at a predetermined temperature for the first portion 22 and a second predetermined temperature may be maintained for the second and third portions 24 and 26. The cooling system includes a condenser 58 which receives ram air from ram air input 60 which blows over the condenser and is dumped overboard by discharge port 62. Ram air is provided by fan 61 during ground static operation. An intercooler 64 is provided to precool the refrigerant prior to application to the evaporator 30 by means of an expansion valve 66. A second expansion valve 68 is provided at the input to the evaporator to control the operation of the evaporator 30. The first expansion valve 66 is controlled by temperature sensor 70 and the second expansion valve 68 is controlled by temperature sensor 72. The function of the first and second expansion valves 66 and 68 is to maintain a superheat condition of the refrigerant as applied to the compressor 52 and 54 to avoid damage. A pressure sensor 74 is monitored by controller 38 to shut down the compressor when the pressure of the refrigerant is so low that the system would freeze up. The temperature sensor 76 is monitored by controller 38 to control the operation of the four-way valve 46 as described below. Junction box 78 receives suitable AC and DC current for operation of the system.

The first mode of operation is described as follows. With reference to FIG. 2, it should be noted that this mode of operation, which is in the first portion 22 of the flight envelope, occurs from the time of ground idle through take off and up to an altitude such as 5,000 feet and extends throughout the entire operation velocity of the aircraft up to the aforementioned altitude limit. The controller 38 causes the valve 46 to be closed to prevent ram air from the ram air supply 44 from being applied to the loop 28. During operation from take off up to the altitude limit 23 of the first portion 22 of the flight envelope, the cooling capacity of the system is sufficient to operate with the loop as a closed loop with the fan 48 supplying the necessary air head to circulate air in the loop through the pod 20 to cool the load therein. Temperature sensor 52 is used to control the cycling on and off the motor 56 of the cooling system to cause the evaporator 30 to maintain a first desired predetermined temperature during the first portion of the flight envelope 22. In one possible mode of operation as illustrated in FIG. 2, the controller 38 may be set to maintain a temperature of the input air to the pod 20 at or below 80° F. such that the motor 56 is caused to be activated when the temperature sensor 52 senses that the air input temperature is above 80° F. It should be understood that other temperature limits may be utilized with the present invention during all three portions 22, 24 and 26 of the flight envelope. Thus, in the first mode of operation, the fan 48 is maintained in an on condition with the four-way valve 36 being positioned closed to prevent air from circulating through the regenerative heat exchanger and overboard via overboard port 40. The relief valve 50 opens when the pressure in the loop 28 exceeds the limit of the pod 20.

The second mode of operation is described as follows. As illustrated in the second portion 24 of the flight envelope of FIG. 2, the invention utilizes the presence of relatively cool ram air from the ram air supply 44 to provide sufficient cooling for the load in the pod 20. During the second mode of operation, as illustrated in FIG. 2, the controller 38 maintains the motor 56 in an off condition which disables the evaporator 30 from cooling the air in the loop 28. The four-way valve 36 is positioned in the first position to cause air from the discharge of the pod 34 to be dumped overboard via overboard port 40. In this position, the regenerative heat exchanger 42 is bypassed. In the second mode of operation the fan 48 is deactivated. This mode is characterized by low power consumption for the reason that the motor 56 is turned off. The relief valve 50 opens when the pressure in the loop 28 exceeds the pressure limit of the pod 20.

The third mode of operation is described as follows. During the third mode of operation, as illustrated in the third portion 26 of the flight envelope in FIG. 2, air entering the ram air input can attain high temperatures in excess of 200° F. which is not suitable for cooling of the pod 20 without refrigeration. In the third mode, the valve 46 is positioned to cause ram air to be applied to the loop 28 by passage through the regenerative heat exchanger 42 at which the air is precooled by the air discharged from the discharge port 34 of the pod 20 and vented overboard by overboard valve 40. Even though the air which is discharged via the discharge port 35 is heated by the electronics in the pod 20, the air is nevertheless at a temperature substantially below that of the input ram air which lessens the load on the evaporator 30. In this mode of operation, the controller 38 maintains the evaporator fan 48 in an off condition which decouples the righthand discharge port 35 from the loop 28. The motor 56 may be maintained in a continually on condition during the third portion 26 of the flight envelope or alternatively may be controlled by the temperature sensor 52 located at the input 32. Either mode of operation may be chosen depending upon the operation condition of the aircraft.

From the foregoing explanation, it is apparent that the present invention provides three distinct modes of cooling for a load contained in the pod 20. It should be understood that modifications may be made to the operation of the present invention under the control of controller 38 to permit different cooling characteristics to be attained for the load of the pod.

While the invention has been described in terms of an embodiment which functions in three distinct portions of a flight envelope of an aircraft, it should be understood that the invention may be utilized with other flight envelope characteristics without departing from the spirit and scope of the invention as defined in the appended claims. Furthermore, while the disclosed embodiment of the invention controls the temperature of an aircraft pod, it should be understood that the invention may be utilized to control the temperature in any closed nonpressurized volume within an aircraft.

We claim:

1. A cooling system for a pod attached to an aircraft comprising:
    (a) an air circulation loop for supplying cooled air to an air input of the pod to cool a load disposed in the pod and for receiving air discharged from an air discharge of the pod which has absorbed heat from the load in the pod;
    (b) a cooling means disposed in the loop which is activated to cool air flowing in the loop prior to application to the pod;
    (c) a fan disposed in the air circulation loop between the cooling means and the air discharge which is activated to blow discharged air toward the cooling means when the aircraft is operated in a first portion of a flight envelope of the aircraft;
    (d) a ram air supply for providing ram air in response to flight of the aircraft;
    (e) a valve, coupled to the ram air supply and to the loop, for blocking the supply of ram air to the loop in response to the aircraft being in the first portion of the flight envelope and for supplying ram air to the loop when the aircraft is outside the first portion of the flight envelope; and
    (f) a controller, responsive to a temperature sensor sensing air temperature of air supplied to the pod, for activating the cooling means in response to the sensing of a temperature above a predetermined temperature when the aircraft is operating in the first portion of the flight envelope.

2. A cooling system in accordance with claim 1 further comprising:
    (a) means for measuring aircraft altitude; and wherein:
    (b) the controller determines whether the aircraft is in the first portion of the flight envelope by monitoring the altitude of the aircraft as determined by the means for measuring aircraft altitude.

3. A cooling system in accordance with claim 2 wherein:
    (a) the aircraft has second and third portions of the flight envelope with each of the second and third portions of flight envelope being determined by the controller as a function of aircraft velocity and altitude as determined by the means for determining altitude;
    (b) the valve is caused to supply ram air to the loop in response to the controller determining that the aircraft is in the second and third portions of the flight envelope;

(c) the fan is caused to be deactivated by the controller in response to the controller determining that the aircraft is operating in the second and third portions of the flight envelope; and (d) the cooling means is caused to be activated in response to the controller determining that the aircraft is operating in the third portion of the flight envelope and deactivated in response to the controller determining that the aircraft is operating in the second portion of the flight envelope.

4. A cooling system in accordance with claim 3 further comprising:

an overboard valve, coupled to the loop and controlled by the controller, for venting air from the loop overboard in response t o the controller determining that the aircraft is operating in the second and third portions of the aircraft flight envelope.

5. A cooling system in accordance with claim 4 further comprising:

(a) a regenerative heat exchanger which precools ram air from the ram air supply which is applied to the cooling means with air discharged from the pod when the aircraft is determined to be operating in the third portion of the flight envelope, with the overboard valve venting air overboard after the air passes through the regenerative heat exchanger; and (b) a relief valve, coupled to the loop, for venting air from the loop when air pressure in the loop exceeds a predetermined pressure.

6. A cooling system in accordance with claim 1 wherein:

the cooling means is activated in response to the temperature sensor sensing a temperature above a predetermined temperature when the aircraft is determined to be operating by the controller in the second and third portions of the flight envelope.

7. A cooling system in accordance with claim 6 wherein:

the predetermined temperature in all of the portions of the flight envelope is the same.

8. A cooling system in accordance with claim 6 wherein:

the predetermined temperature in the second and third portions of the flight envelope is the same and differs from the predetermined temperature in the first portion of the flight envelope.

9. A cooling system in accordance with claim 6 wherein:

the predetermined temperature in all portions of the flight envelope differs.

10. A cooling system in accordance with claim 9 wherein:

the predetermined temperature is a function of aircraft altitude and velocity.

11. A cooling system for a nonpressurized volume within an aircraft comprising:

(a) an air circulation loop for supplying cooled air to an air input of the volume to cool a load disposed in the volume and for receiving air discharged from an air discharge of the volume which has absorbed heat from the load in the volume;

(b) a cooling means disposed in the loop which is activated to cool air flowing in the loop prior to application to the volume;

(c) a fan disposed in the air circulation loop between the cooling means and the air discharge which is activated to blow discharged air toward the cooling means when the aircraft is operated in a first portion of a flight envelope of the aircraft;

(d) a ram air supply for providing ram air in response to flight of the aircraft;

(e) a valve, coupled to the ram air supply and to the loop, for blocking the supply of ram air to the loop in response to the aircraft being in the first portion of the flight envelope and for supplying ram air to the loop when the aircraft is outside the first portion of the flight envelope; and (f) a controller, responsive to a temperature sensor sensing air temperature of air supplied to the volume, for activating the cooling means in response to the sensing of a temperature above a predetermined temperature when the aircraft is operating in the first portion of the flight envelope.

* * * * *